United States Patent [19]

Hooper et al.

[11] 4,263,111

[45] Apr. 21, 1981

[54] HYDROGEN GENERATION UTILIZING SEMICONDUCTING PLATELETS SUSPENDED IN A DIVERGENT VERTICALLY FLOWING ELECTROLYTE SOLUTION

[75] Inventors: Richard M. Hooper, Vernon; Russell G. Meyerand, Jr., Glastonbury, both of Conn.

[73] Assignee: United Technologies Corporation, Hartford, Conn.

[21] Appl. No.: 104,251

[22] Filed: Dec. 17, 1979

[51] Int. Cl.³ ............................................. C25B 1/04
[52] U.S. Cl. .................................. 204/129; 204/128; 204/222; 204/DIG. 3; 429/111
[58] Field of Search ................ 204/128, 129, DIG. 3, 204/222; 429/111

[56] References Cited

U.S. PATENT DOCUMENTS

| | | | |
|---|---|---|---|
| 3,756,930 | 9/1973 | Weiss et al. | 204/129 |
| 3,954,577 | 5/1976 | Levine | 204/59 R |
| 4,011,149 | 3/1977 | Nozik | 204/129 |
| 4,021,323 | 5/1977 | Kilby et al. | 204/129 |
| 4,042,758 | 8/1977 | Weinstein et al. | 429/111 |
| 4,069,120 | 1/1978 | Meyerand, Jr. et al. | 204/129 |
| 4,088,556 | 5/1978 | Pellegri et al. | 204/222 |
| 4,094,751 | 6/1978 | Nozik | 204/80 |
| 4,110,180 | 8/1978 | Nidola et al. | 204/128 |
| 4,128,701 | 12/1978 | Maricle | 429/21 |
| 4,129,683 | 12/1978 | Maricle | 429/21 |
| 4,137,136 | 1/1979 | Ueda et al. | 204/98 |
| 4,147,600 | 4/1979 | Rutherford et al. | 204/98 |
| 4,147,602 | 4/1979 | Garbuny et al. | 204/157.1 R |

OTHER PUBLICATIONS

S. N. Frank et al., "Semiconductor Electrodes. 12. Photoassisted Oxidations and Photoelectrosynthesis at Polycrystalline TiO₂ Electrodes, " *J. Am. Chem. Soc.,* vol. 99, Jul. 1977, pp. 4667–4675.

W. Glass et al., "Performance of Hydrogen–Bromine Fuel Cells," *Advances In Chemistry,* vol. 47 (1965), Am. Chem. Soc., pp. 203–219.

*Primary Examiner*—Aaron Weisstuch
*Attorney, Agent, or Firm*—Harry J. Gwinnel

[57] ABSTRACT

Hydrogen is produced from an electrolyte solution by suspending semiconducting platelets in a vertically flowing solution of the electrolyte contained in a radiant energy transparent, vertically disposed divergent fluid conduit. By utilizing a divergent fluid conduit to suspend the platelets in the vertically flowing electrolyte the platelets are maintained in a substantially stable equilibrium position in the conduit with a constant electrolyte flow rate and the particular array of platelets in the conduit can be specifically controlled by simply varying the weight, size or shape of the platelets, further improving the hydrogen generating capability of such system. The fluid conduit is impinged with radiant energy of sufficient wavelength to cause charge transfer in the platelets dissociating the electrolyte solution producing the hydrogen gas. The platelets are maintained suspended in the vertically flowing electrolyte by controlling the flow rate of the electrolyte solution. The respective dissociation products are collected for subsequent energy generation. For example, if a bromide electrolyte is used the bromine is also collected. The semiconducting platelets comprise an n-doped semiconducting layer, ohmic contact, and p-doped semiconducting layer, at least the edge of the ohmic contact being covered by an insulation layer.

6 Claims, 9 Drawing Figures

HYDROGEN GENERATION UTILIZING SEMICONDUCTING PLATELETS SUSPENDED IN A DIVERGENT VERTICALLY FLOWING ELECTROLYTE SOLUTION

TECHNICAL FIELD

The field of art to which this invention pertains is electrolytic processes for producing hydrogen gas.

BACKGROUND ART

The use of solar energy to power electrolytic cells has received widespread attention in view of recent energy resource depletion and environmental pollution awareness. The production of hydrogen from electrolytic cells and the use of solar energy to power such cells has been recognized as a marriage of two arts which has great potential in the solution of both these problems. And while much work has been done on improving the efficiency of such systems, note commonly assigned and copending applications Ser. Nos. 956,760, now U.S. Pat. No. 4,203,814; 956,761 now U.S. Pat. No. 4,203,813; 56,565 now U.S. Pat. No. 4,218,301; and 65,824 filed Nov. 1, 1978, Nov. 1, 1978; July 11, 1979; and Aug. 13, 1979 respectively, most of this work has centered on the use of conventional electrolytic cells. In a conventional electrolytic or photochemical cell an electrical connection is required between the anode and cathode and such connection is generally external to the cell. In order to produce large amounts of hydrogen from such systems, a considerable number of photoanodes and cathodes would be required, and there is a natural loss of efficiency because of the distance required between such electrodes. Attempts at minimizing this problem have included reducing the distance between the electrodes to reduce the $I^2R$ losses in the electrolyte. Note, for example, U.S. Pat. No. 4,094,751.

What is needed in the art is a processing system with increased efficiency to improve on systems of the prior art.

DISCLOSURE OF INVENTION

In accordance with the present invention a process of converting an electrolyte solution to hydrogen gas is described comprising suspending semiconducting platelets in a vertically flowing solution of electrolyte contained in a vertically disposed fluid conduit which is light energy transparent. By utilizing a divergent fluid conduit to suspend the platelets in the vertically flowing electrolyte the platelets are maintained in a substantially stable equilibrium position in the conduit with a constant electrolyte flow rate and the particular array of platelets in the conduit can be specifically controlled by simply varying the weight, size, or shape of the platelets, further improving the hydrogen generating capability of such system. The fluid conduit is impinged with radiant energy of sufficient wavelength to cause sufficient charge transfer in the platelets to dissociate the electrolyte solution into hydrogen gas. The respective reaction products are collected for subsequent energy generation. The semiconducting platelet useful in the above-described process comprises an n-doped semiconducting layer and p-doped semiconducting layer separated by and contacting an ohmic contact, the platelet edge being covered by an insulation layer to avoid short circuit and the platelet being of such size and weight as to be capable of substantially static suspension in the flowing electrolyte solution.

The foregoing and other objects, features and advantages of the present invention will become more apparent from the following description of preferred embodiments and accompanying drawings.

BEST MODE FOR CARRYING OUT THE INVENTION

Figures 1, 2:
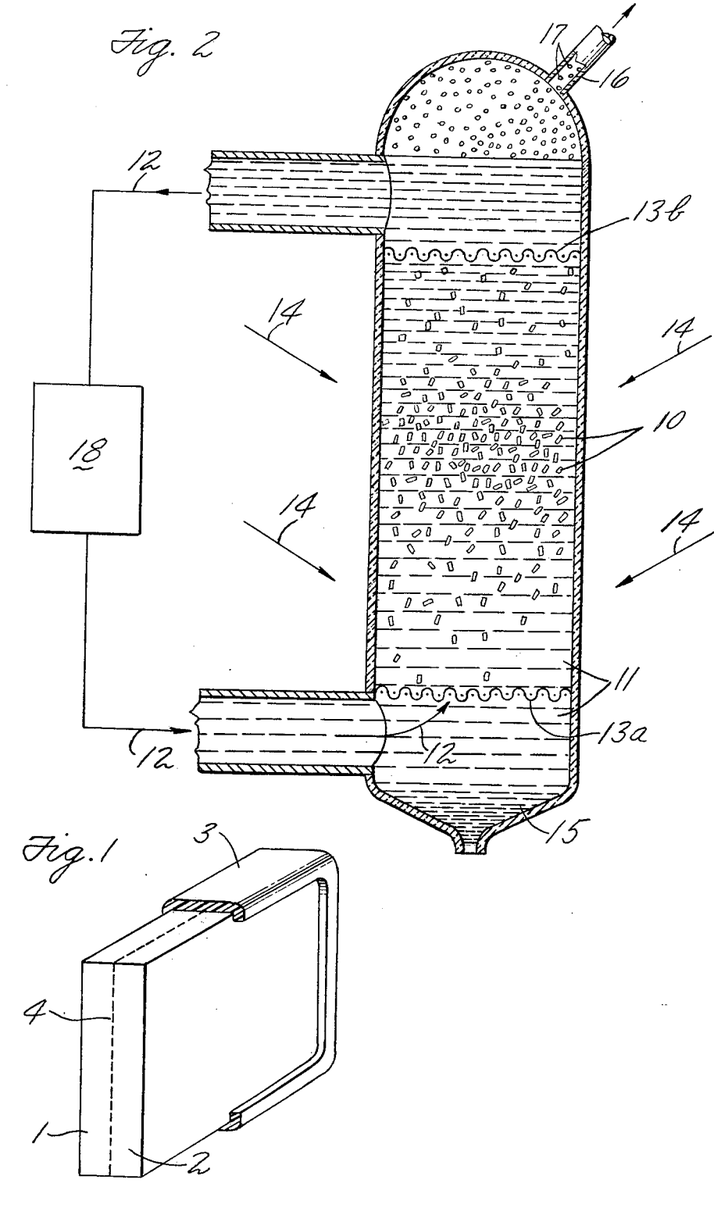
FIG. 1 describes a typical platelet in accordance with the present invention.
FIG. 2 describes an apparatus similar to that of the present invention for performing a similar process.

A typical platelet useful in accordance with the present invention is shown by FIG. 1. While a square shape is shown in the figure, the particular shape is not critical. For ease of manufacturing, square or rectangular platelets are preferred; however, spheres, ellipses, parallelepipeds, etc., may also be used. For ease of presentation the aerodynamic calculations below are based on a spherical "platelet". Although in practice such a particle shape may be difficult to fabricate, a laminate or composite of a more readily formable shape may be used. It should be noted that the calculations are presented would still be representative of any actual flowing system regardless of "platelet" shape. In particular this is true for the conical platelets described in FIGS. 6 through 9. As to the size of the platelets, the size and weight should be large enough to produce the potential difference necessary to dissociate the electrolyte in the solution but light enough to stay in suspension in the flowing electrolyte. The platelets preferably have a photoactive surface area at least 1 mm$^2$ on each photoactive side with the thickness as described below. The average weight will vary according to the material used. In fact, by utilizing the vertically flowing system of the present invention great advantage is realized over systems of the prior art (e.g., U.S. Pat. No. 4,094,751) because larger platelets (e.g., with photoactive surface area greater than 1 mm$^2$ on each side) can be used with their greater radiant energy gathering capability.

The platelet has four essential components, an n-doped semiconducting layer, an ohmic contact layer, a p-doped semiconducting layer, and an edgewide insulating layer.

For resistance reasons, it is preferred that both the n-doped and p-doped semiconducting layers are each less than 2 microns thick. The thickness of the ohmic contact should similarly be limited to reduce resistances but will be generally thinner than the semiconducting layers and also preferably less than 2 microns thick.

The composite is preferably formed by conventional deposition methods such as chemical and physical vapor deposition. Either the three components can be sequentially deposited on a releasable substrate or two layers can be either sequentially deposited on either the p-doped or n-doped semiconducting free-formed layer or the semiconducting layers can be deposited on opposite sides of the ohmic contact. The materials can also be mechanically attached, for example, being held together by the edgewise insulation layer. But regardless of how the composite is formed, the presence of the insulation layer should aid in holding the platelet together during use. The insulation layer can be coated on the edge of the ohmic contact or composite or preformed and laminated on. It can also be applied as a bead, e.g., like a caulking compound.

It should be noted that any conventional n-doped and p-doped semiconducting material and ohmic contact and insulation material can be used in the platelets of the present invention with the caveat that there must be sufficient dopant present in both the n-and p-doped semiconducting layers to permit charge transfer through a single ohmic contact layer bridging the two semiconducting layers. In the order of $10^{19}$ to $10^{20}$ atoms of dopant per cc of semiconducting material or about one atomic percent should be sufficient to accomplish this result. The semiconducting material should also be chosen to collect radiant energy of the greatest spectra. However, the individual semiconducting material can be matched to a particular wavelength of radiant energy if it is known in advance that radiant energy of that specific wavelength will primarily be emitted from the radiant energy source. As the n-doped semiconducting material, materials such as amorphous silicon overcoated with a thin layer of platinum and doped with phosphorous, arsenic or antimony; and gallium arsenide doped with sulfur, selenium, tellurium, silicon or tin can be used. As the p-doped semiconducting material, gallium arsenide doped with zinc, magnesium, beryllium or cadmium can be used. Aluminum, gold or molybdenum can be used as the ohmic contact material and as the insulation material conventional materials such as epoxy resin or ceramic insulation material can be used. A mixture of semiconducting material can also be used to take advantage of the different radiant energy wavelength collecting ability of specific semiconducting material.

In FIG. 1, the n-doped semiconductor is indicated as 1 and p-doped semiconductor indicated as 2. The edgewise insulation material (e.g., conventional epoxy resins) is indicated as 3 and shown broken away to expose the ohmic contacts 4. The insulation material can be small enough to simply cover the ohmic contact layer or as shown by FIG. 1, it can be wide enough to in effect edgewise encapsulate the platelet forming a mechanical lock as well on the platelet.

As stated above, the apparatus according to the present invention is vertically disposed to take advantage of the earth's gravitational forces, vertical being the direction parallel to the earth's gravitational forces. The gravitational forces will act on the platelet semiconducting particles countering the electrolyte solution vertical flow to maintain the particles in suspension in the area defined, for example, by B and C in FIG. 9 and $d_1$ and $d_2$ in FIG. 8, vertical flow of the solution being flow with a velocity vector parallel to and opposite the gravitational force vector. By selecting the proper flow conditions to counter these gravitation forces, and utilizing a divergent fluid conduit, a stable equilibrium condition is established in the system between the flowing electrolyte and the semiconducting platelets which will not only maintain the platelets in suspension in the defined area, for example between top and bottom screens, but in addition will suspend the platelets stably at substantially predetermined levels.

To determine representative equilibrium flow conditions for a particular system according to the present invention, the physical relationships defined by the following equations may be used. The terms of such equations are defined as follows:

V = volume of the platelet;
M = mass of the platelet
d = diameter of platelet (sphere)
D = Drag force;
$C_D$ = drag coefficient;
S = area parameter (for a sphere)
$\rho$ = density of working fluid;
u = velocity of working fluid;
$\rho_g$ = density of GaAs;
$\rho_w$ = density of water;
$\rho_E$ = effective density of platelet (sphere) compensating for water = $\rho_g - \rho_w$;
W = platelet weight minus its buoyancy force;
g = gravitational acceleration (32.2 ft/sec$^2$);
$\mu$ = viscosity of working fluid;
$\nu$ = kinematic viscosity of working fluid ($\mu/\rho$)
Re = Reynolds Number ($\rho u d/\mu$).

In the exemplary system described below, calculations are based on GaAs as the platelet material, with a 1 mm spherical diameter, the working fluid being water at room temperature. For actual systems the appropriate corresponding values of the above-defined terms for the particular working fluid, platelet materials and associated dimensions used would have to be substituted into the respective equations infra.

A particle suspended in the manner called for by the present invention will be in equilibrium when its aerodynamic drag plus its buoyancy balances its weight. The drag (D) can be expressed as:

$$D = \frac{C_D S \rho u^2}{2}$$

It is assumed for most systems practiced according to the present invention that the weight will be larger than the buoyancy force, and this resultant vector is called W. Both the drag coefficient and area parameter are functions of the particle geometry, and the quantity $(C_D S)/W$ is frequently called the ballistic coefficient. The particle will be in equilibrium when $$W = C_D S \frac{\rho u^2}{2}$$
or
$$\left(\frac{C_D S}{W}\right)\left(\frac{\rho u^2}{2}\right) = 1$$

The area parameter S (frontal area of the platelet exposed to the flow of the working fluid) for a sphere is $\pi d^2/4$ (Schlichting, *Boundary Layer Theory*, 4th ed., p. 15 and Goldstein, *Modern Developments in Fluid Dynamics*, vol. 1, p. 15).

$$W = [(\rho_g V)g - (\rho_w V)g] = [(\rho_g - \rho_w)V]g$$

or $$\rho_E Vg.$$

For the sphere-shaped platelet of the exemplary system $V=4/3\pi r^3 (r=d/2)$. By substituting these values into the equilibrium equation, the result is $C_D=4/3(\rho_E g\, d/\rho u^2)$. Since $\rho_E=332$ lb/ft$^3-62$ lb/ft$^3=270$ lb/ft$^3$ or 8.39 slug/ft$^3$, $g=32.2$ ft/sec$^2$, $d=3.33(10)^{-3}$ ft and $\rho=1.92$ slug/ft$^3$, the equilibrium flow condition for a spherical "platelet" with a diameter of 1 mm is defined in terms of velocity of the working fluid as $$C_D=0.625/u^2 \quad \text{(equation 1)}$$

where u is defined in ft/sec.

$C_D$ is also a function of the Reynolds Number of a flowing system.

$$C_D=f(Re) \quad \text{(equation 2)}$$

Figure 3:
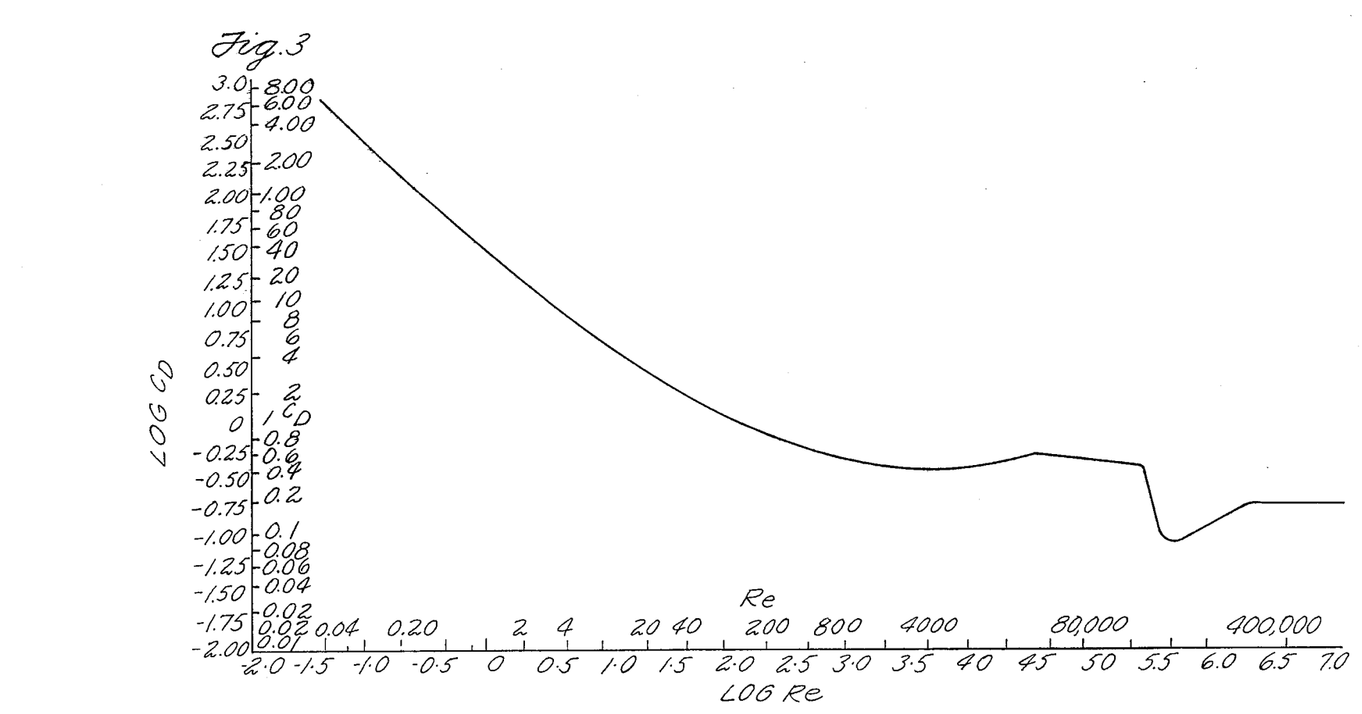
FIG. 3 demonstrates graphically drag coefficient as a function of Reynolds Number for a spherical particle.
Figure 4:
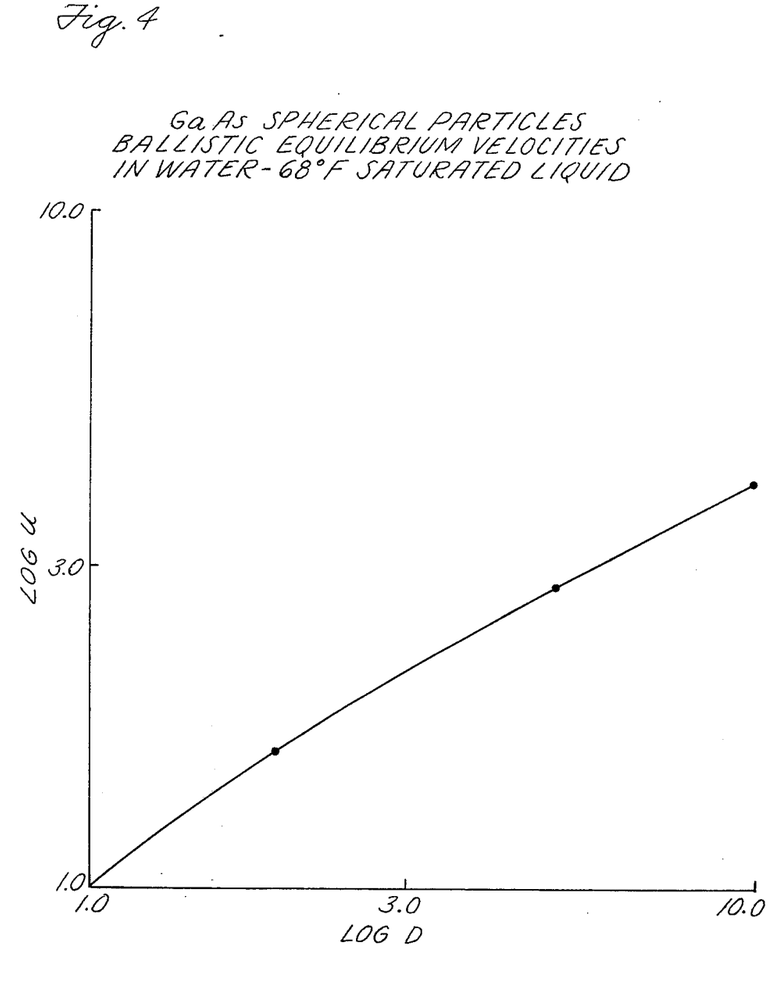
FIG. 4 demonstrates equilibrium velocities for GaAs spheres suspended in a uniform vertical water flow.

FIG. 3 demonstrates the $C_D$ values for respective Re values for a spherical-shaped particle for substantially all of the working fluids useful in the present invention. This relationship can be determined experimentally for different shaped particles as described by Goldstein infra, pps. 15 and 16 which is the source of both equation 2 and FIG. 2 for a sphere. Reynolds Number is defined as $Re=ud/\nu$. $\nu$ for water at 68° F. (saturated water)$=1.083\,(10)^{-5}$ ft$^2$/sec (Eckert and Drake, *Heat and Mass Transfer*, 2nd ed., p. 500). Accordingly, in terms of u for a 1 mm sphere in water $$Re=307u \quad \text{(equation 3)}$$

where u is defined in ft/sec.

graphically by FIG. 4 where u=water velocity in ft/sec and d=particle diameter in mm.

FIG. 2 shows the apparatus useful for performing a similar process as described in commonly assigned, copending application Ser. No. 104,252 filed Dec. 17, 1979. In this figure, 10 indicates platelet particles; 11 indicates the hydrobromic acid electrolyte solution flowing as indicated by arrow 12. In this particular embodiment, the flow of the electrolyte is such that the particles remain substantially suspended between the area defined by screens 13a and 13b. Non-conducting screens such as Teflon can be employed with openings large enough for smooth electrolyte flow but small enough to contain the platelets. The impinging radiant energy is indicated as 14. As stated, the electrolyte is indicated flowing by arrows 12 and as the electrolyte, such as hydrobromic acid dissociates, the bromine settles to the bottom of the apparatus, the bromine indicated as 15 and the hydrogen gas 17 bubbles to the surface and is expelled through port 16. The hydrobromic acid electrolyte solution can be run through a monitoring station indicated as 18 and additional electrolyte added as needed. Monitoring can be done by conventional solution sampling techniques. In operation, the bromine concentration will build up in the electrolyte solution and can also be drawn off for example at location 18 of the apparatus by means of filters but preferably the bromine will settle out as a liquid at high concentrations, for example, at location 15, and can be removed by either draining or preferential extraction with an immiscible solvent such as CCL$_4$. To insure that the platelets are maintained suspended in the working fluid in the system described above by FIG. 2 and to compensate for turbulent effects it is necessary to either pulse the electrolyte flow rate around the equilibrium flow rate or monitor the location of the platelets in the

TABLE I

Equilibrium Velocities For GaAs Spheres Suspended Vertically In A Uniform, Vertical Water Flow

| Spherical Particle Diameter | Equilibrium Condition | Drag Law | Re-Velocity Relation | Equilibrium Velocity | Reynolds Number |
|---|---|---|---|---|---|
| d | $C_D = \frac{4}{3}\,\frac{\rho_E}{\rho}\,\frac{gd}{u^2}$ | $C_D = f(Re)$ | $Re = \frac{ud}{\nu}$ | u | Re |
| 0.1 mm | $C_D = \frac{0.0625}{u^2}$ | $C_D = f(Re)$ | $Re = 30.7u$ | 0.06 ft/sec | 1.84 |
| 1.0 mm | $C_D = \frac{0.625}{u^2}$ | $C_D = f(Re)$ | $Re = 307u$ | 1.0 ft/sec | 307 |
| 5.0 mm | $C_D = \frac{3.13}{u^2}$ | $C_D = f(Re)$ | $Re = 1542u$ | 2.80 ft/sec | 4318 |
| 10.0 mm | $C_D = \frac{6.25}{u^2}$ | $C_D = f(Re)$ | $Re = 3070u$ | 3.92 ft/sec | 12157 |
| 1.9 mm | $C_D = \frac{1.188}{u^2}$ | $C_D = f(Re)$ | $Re = 584u$ | 1.61 ft/sec | 940 |

Equations 1, 2 and 3 represent three simultaneous equations with three unknowns—drag coefficient, Reynolds number and velocity. By selecting the appropriate velocity, all three equations can be satisfied and equilibrium flow conditions determined for the particular system chosen. At this flow rate, the selected particles will be maintained in suspension in the vertically flowing electrolyte in the confined area, e.g., between screens 13 in FIG. 2. For the 1 mm GaAs particles described above in a vertically flowing water system such flow rate would be 1.0 ft/sec. Other representative values for different sized particles are shown in Table I, and vertically flowing electrolyte and either increase or decrease the flow rate around the equilibrium flow rate accordingly. While this expedient could be incorporated into the apparatus of the present invention, the use of the divergent conduit of the present invention eliminates the need for all such variants.

Figure 5:
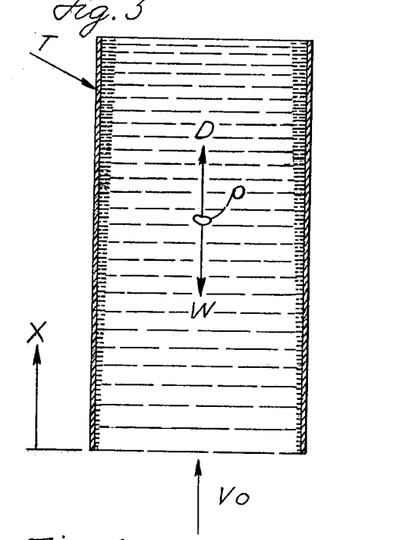
FIG. 5 demonstrates an aerodynamic representation of a constant area fluid conduit.

By referring to FIGS. 5 to 9, the improvements of the present system over, e.g., that of R-2221 can be seen. In all of the figures and as particularly specified in FIGS. 5 and 6, the dimension X with associated arrow indicates that in the dimensions calculated, X will be a positive value in the direction indicated. In FIG. 5 the arrow marked $V_0$ indicates the conduit inlet velocity and P is a platelet according to the present invention with a drag force D and a vector weight (weight minus buoyancy force) W. In operation, in the system described by FIG. 2, this platelet will be suspended at the equilibrium point of the vertically flowing system (note the calculations infra). However, under normal flow conditions, a boundary layer indicated as T in FIG. 5 (displacement thickness of side wall boundary layer) will develop in the fluid conduit creating an aerodynamically convergent duct, resulting in an accelerating subsonic incompressible flow field. Assuming that the platelet is in an equilibrium condition at the position indicated on the figure, if it is displaced either upward slightly or downward slightly, for example by turbulent conditions, either its drag force will increase, pushing it up into a region of continuously higher velocity, or its drag force would decrease, allowing it to sink into a region of continuously decreasing velocity. In either case, the equilibrium condition will quickly disappear. This makes the flow-pulsing or particle location-monitoring described above necessary for stable operation of such system.

Figure 6:
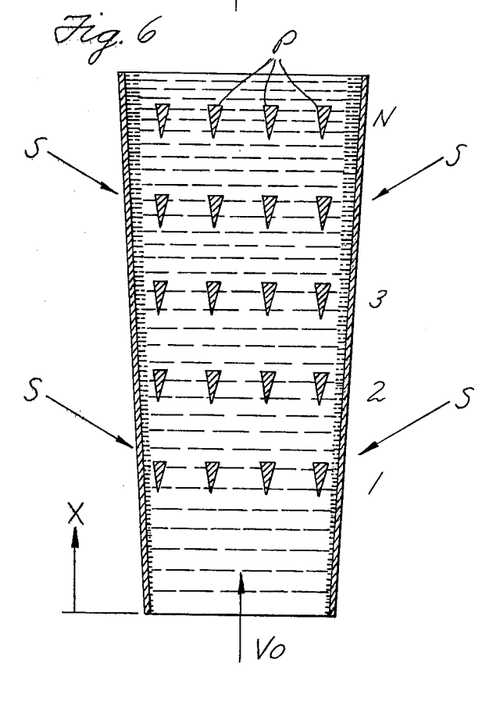
FIG. 6 demonstrates an aerodynamic representation of a divergent fluid conduit.

FIG. 6 demonstrates the present invention in its simplest form. S in this figure represents radiant energy such as solar energy. In the system described by FIG. 5, $\Delta u/\Delta X$ (change in fluid flow velocity/change in upward location) is greater than zero. Accordingly, as the electrolyte solution moves up the conduit the flow accelerates, and accordingly represents an accelerating passage. However, in the system described by FIG. 6, $\Delta u/\Delta X$ is less than zero so the passage is considered a decelerating passage. Therefore, in the system demonstrated by FIG. 6, as any particular platelet P moves up the fluid conduit diverging from its stable equilibrium position, the drag force described by the equation $D = C_D S \rho u^2/2$) would decrease since the velocity (u) of the working fluid decreases as the particle moves up the fluid conduit. Accordingly, since the drag decreases, the particle will sink returning to its stable equilibrium position. Similarly, if a system instability causes the particle to sink to a lower level, the velocity would be greater than at the level it has just sunk from, the drag force would increase and the opposite would be true, the platelet rising to its stable equilibrium position. By simply varying either the weights of the particles or their shapes or sizes, a series of particles could be maintained suspended at various respective levels, for example, 1, 2, 3 and N in FIG. 6. For example, by referring to the exemplary system described above for a GaAs spherical particle suspended in flowing water at 68° F., by simply varying the diameters of the particles, the spheres would come to rest at various respective levels indicated by Table II. So if one desired to suspend particles at the different locations in the divergent conduit where the flow rates were 1.0, 1.1, 1.2, 1.3, 1.4, and 1.5 ft/sec respectively, one would merely size the particle diameters to be 1.00, 1.11, 1.24, 1.38, 1.54 and 1.71 mm respectively. Not only would this provide a more stable system than that described by FIG. 2 but a greater number of particles could be suspended stably at a greater number of levels increasing the radiant energy gathering capability of the system in significant degree. It is reasonable to conclude that as such, the system would be of far greater energy producing capability as compared to such systems as disclosed in U.S. Pat. No. 4,094,751, for example.

Each particular system would also be stable over a range of inlet velocities and if the inlet velocity were to shift slightly, the effect would merely be to shift the entire grid, representing a small shift in height for each level.

The principal limitation on the angle ($2\theta$ in FIG. 8) of the divergent section of the fluid conduit is that it not be so great as to produce stall. By preventing stall is meant preventing the boundary layer from separating from the wall area of the divergent section of the conduit.

TABLE II

| u ft/sec | Spherical GaAs Particle Diameter mm |
|---|---|
| 1.00 | 1.00 |
| 1.10 | 1.11 |
| 1.20 | 1.24 |
| 1.30 | 1.38 |
| 1.40 | 1.54 |
| 1.50 | 1.71 |

For example, for the divergent fluid conduit according to the present invention (assuming one-dimensional flow) where $u_1$ and $A_1$ represent the velocity and cross-sectional area at $d_1$, and $u_2$ and $A_2$ represent the same values at $d_2$ ($\rho$=density of working fluid as defined above, $\rho u_1 A_1 = \rho u_2 A_2$ or $u_1/u_2 = (d_2/d_1)^2$. So, for example, in a system where it is desired that there be a 77% difference in inlet and outlet velocities in the divergent portion of the electrolyte solution fluid conduit to suspend a particular array of particles the ratio of $d_2/d_1 = 1.33$. A selection of $d_1 = 1.5$ ft and $d_2 = 2.0$ ft would meet this requirement and the length would then have to be varied to prevent stall. By selecting a length (e.g., L in FIG. 8) of say 9 ft, the conduit angle ($2\theta$) would be 3.18°. By referring to stall charts for divergent flow (Reneau, Johnston and Kline, "Performance and Design of Straight, Two-Dimensional Diffusers", *Journal of Basic Engineering*, March 1967, p. 142) for $2\theta = 3.18°$ and $L/d_1 = 6$, it can be seen that such a design will be stall free.

Figure 7:
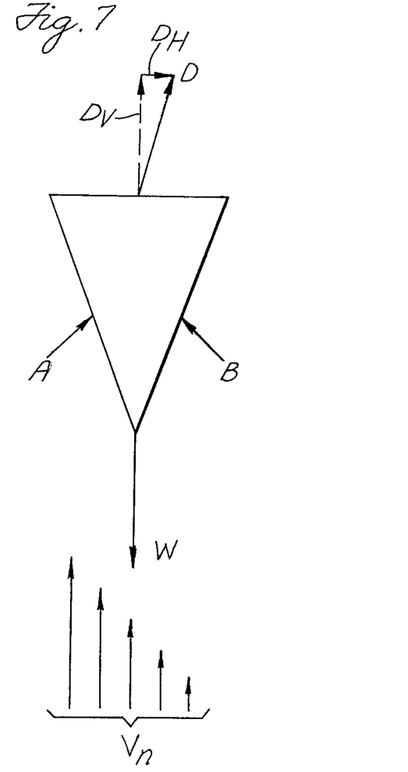
FIG. 7 demonstrates typical drag forces on a particle in a nonuniform flow.

Although two-dimensional and three-dimensional and viscous effects are details which complicate the aerodynamics of the system, they will complicate the calculations but not the end result. Such effects also obey the principles described above. Referring to FIG. 7, if a platelet were in vertical equilibrium ($D_V = W$) and is subject to a radial velocity gradient ($V_n$ where the length of each arrow indicates the relative strengths of their respective vectors) the platelet will move horizontally to a point of lesser velocity. For example, utilizing the same reasoning as described above, surface A seeing a higher velocity will experience a greater drag. Similarly, surface B seeing a lower velocity will experience a smaller drag. And accordingly, the particle will respond as described above. $D_H$ in this figure is the horizontal drag experienced by the particle and $D_V$ the vertical drag experienced by the particle with D being the actual drag vector experienced by the particle. In this sytem since the particle is in vertical equilibrium in a flow field with a radial velocity gradient, $D_V$ is assumed equal to W. Another consideration to be made is the fact that the system should be designed to decrease the likelihood of the platelets being driven into the viscous low energy boundary layers at the walls of the conduits which would obviously result in a loss of at least some ballistic control. For the majority of designs this would not be a problem since the divergent contouring would provide a large inviscid core flow minimizing this effect. Furthermore, the platelets can be made with a diameter larger than the anticipated wall boundary level thicknesses. This is demonstrated schematically in FIG. 8 by boundary layer T and particle $P_1$. In addition to this size limitation, other means of insuring that the platelet will not become totally immersed in the boundary layer include attaching or designing fins or pegs longer than the anticipated boundary layer into the platelet. For example, for the rectangular platelet of FIG. 1, such attached pegs could effectively give cubic dimensions to the platelet.

Figure 8:
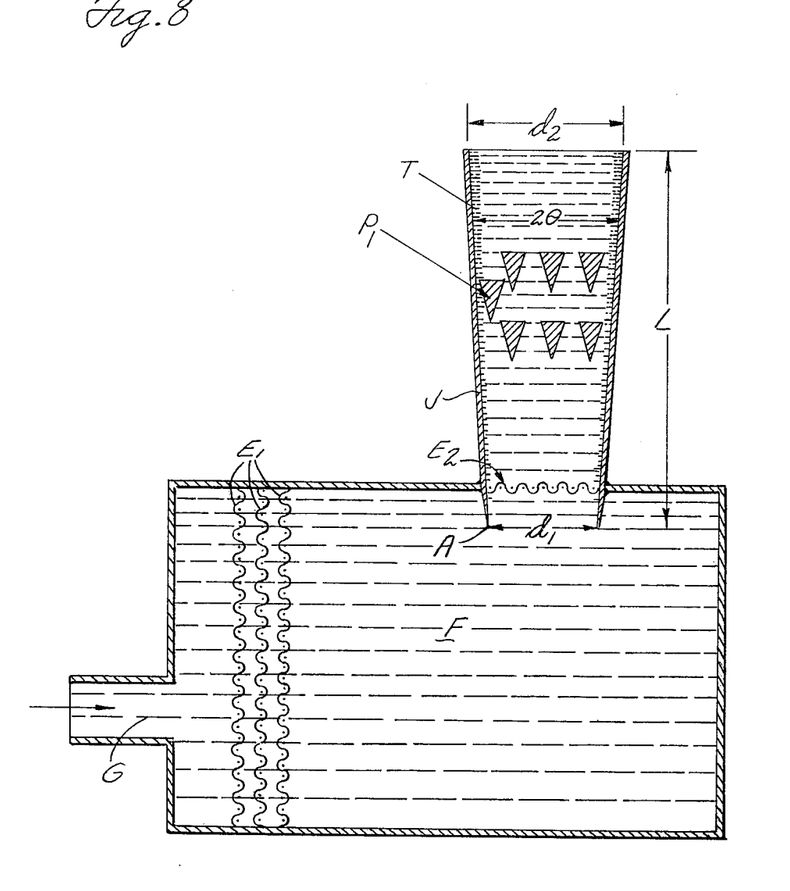
FIG. 8 demonstrates a particular apparatus according to the present invention.
Figure 9:
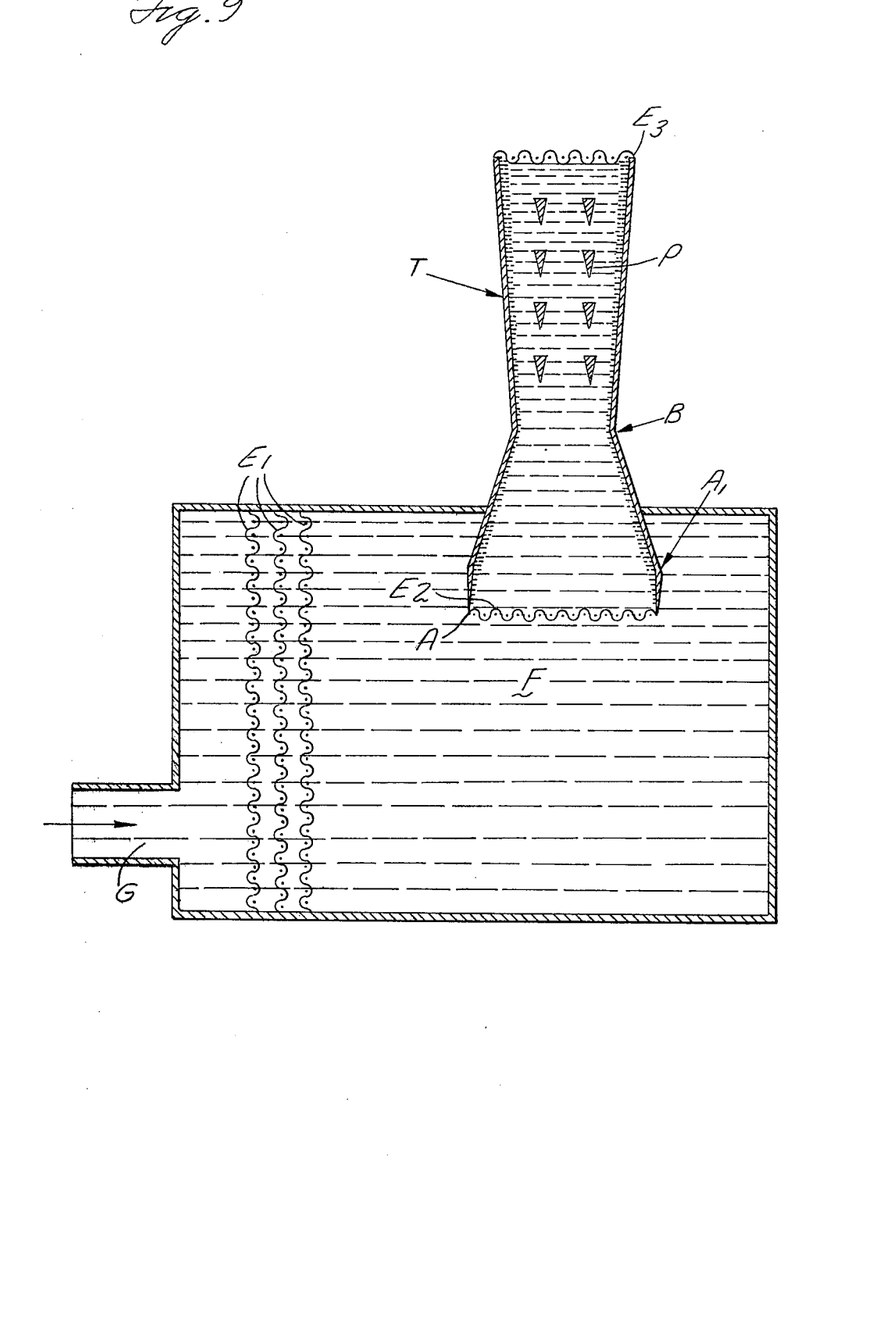
FIG. 9 demonstrates another apparatus according to the present invention.

Particular embodiments of the divergent duct system according to the present invention are demonstrated by FIGS. 8 and 9. As shown by FIG. 8, the flowing electrolyte solution enters the system through G and passes a series of screens $E_1$ to stabilize flow and minimize turbulence. The electrolyte solution becomes relatively stagnant in large plenum F. The electrolyte then begins moving upwards in fluid conduit J having length L and containing platelets $P_1$. In this exemplary system, $d_1$ is about 1.5 ft and $d_2$ about 2.0 ft resulting in an angle $2\theta$ of about 3.18°. To further stabilize flow and begin flow with a minimal inlet boundary layer thickness the edge A can be a sharp edge. Screen $E_2$ provides a resting place for the platelets P during shutdown of the system. The screen can be removed once operation begins to lessen its effects on the flow. When the screen (or plurality of screens as in FIG. 9) is optionally removed after startup, it would of course have to be reinserted prior to shutdown to prevent the particles from coming to rest in plenum F. It is understood that the remainder of the system, for example, the electrolyte dissociation product collection system can be as described above in FIG. 2. If it is desired to leave the screens in place, and since the effect of the screens on flow would be greater with a greater flow velocity (as noted in the equations above, the drag is directly proportional to the square of the velocity) this effect can be minimized by reducing the flow rate. If under this combination of circumstances, the flow rate is not sufficient to keep the particles suspended, the particles can be made more buoyant, for example, by employing a hollow platelet center.

FIG. 9 demonstrates another apparatus helpful according to the present invention. As with FIG. 8, the flow enters at point G and perturbations countered by flowing through screens $E_1$. Once in relative stagnation in large plenum F the flowing electrolyte enters a convergent-divergent duct system, particularly adapted to handle 2- and 3-dimensional and viscous effects. The particular apparatus described by this embodiment minimizes boundary layer effects by producing not only a large inviscid core but a radial velocity profile with a velocity minimum away from the conduit wall. Accordingly, the platelets would remain stably suspended in the core, near the point of minimum velocity. Note the discussion of FIG. 7 above. In FIG. 9 the flowing electrolyte, once it is in relative stagnation in large plenum F, enters a constant area conduit passing by the sharp edge A. The constant area conduit section would be between sharp edge A and point $A_1$ in FIG. 9. The constant area conduit is immediately followed by a convergent vertical duct section between points $A_1$ and B. The constant area section would have an approximately uniform radial velocity profile. The immediately following convergent vertical duct provides a large substantially uniform velocity profile at point B with maximum velocity at the edge of the inviscid core, near the conduit wall, and minimum velocity at the center of the conduit. The remainder of the geometry of the conduit from point B to point $E_3$ is as described in FIG. 8. The inlet condition of large substantially uniform velocity at point B with a small minimum central velocity allows the dimensions of the ducts to be chosen to provide a diverging, decelerating flow from points B to $E_3$ with the desired minimum velocity away from the duct wall. This provides an ideal way to minimize boundary layer effects, further contributing to the stability of the system. As with FIG. 8, screens can be placed at $E_2$ (or B) and $E_3$, the screen at $E_2$ providing a resting point for the platelets during shutdown and the screen at $E_3$ providing a barrier to the platelets during startup where a flow above equilibrium would be required to get the platelets out of the convergent $A_1$-B portion of the duct. Such screens can also be made removable. Since the velocity at the core of the duct is slower than that nearer the edges of the core, the platelets would naturally tend toward the core center, further insuring minimal involvement with the boundary layers in the ducts. It should also be understood that this embodiment will perform in substantially the same manner without the constant area duct (A to $A_1$), preferably with a sharp edge at point $A_1$. Preferably, in the embodiment demonstrated by FIG. 9, the cross-sectional area at point $A_1$ should be less than the cross-sectional area at the end of the divergent portion of the conduit (point $E_3$ of FIG. 9), and the cross-sectional area at point B would be less than at either $A_1$ or $E_3$ taking into account the stall consideration discussed above and flow velocity considerations to support the system platelets. The relative heights (h being a linear measure of height) are preferably about h (section A to $A_1$), $3h$ (section $A_1$ to B) and $6h$ (section B to $E_3$) taking into account the stall considerations discussed above.

In addition to the two variations disclosed, it would be obvious to those skilled in the art to make various modifications of a system with a divergent conduit to further minimize two-dimensional, three-dimensional and viscous effects on the stability of the platelets. Other possibilities for improving stability and minimizing boundary layer effects include such things as utilizing boundary layer bleed, suction, splitter plates, and tangential wall jets. And while any basic divergent shaped conduit will be useful in accordance with the present invention the conduit should be radiant energy transparent on all sides. By divergent is meant a fluid conduit with a cross-sectional area at its exit greater than the cross-sectional area at its inlet, preferably with a continuously increasing cross-sectional area from inlet to exit. Circular cross-section conduits are particularly suitable in this regard. Furthermore, in view of the lack of transparency of the ohmic contact layer it is necessary to illuminate both sides of the platelet with radiant energy simultaneously. This will generally be insured by the diffraction (and to some extent refraction) of the radiant energy off of the tumbling particles in the electrolyte solution. However, it is preferred to have radiant energy reflectors on that side of the fluid conduit opposite the radiant energy source to both improve efficiency and to insure simultaneous illumination of the platelets on all photoactive sides. While straight-angled reflectors are useful and easier to construct, circular cross-section reflectors are preferred to match the preferred circular cross-section conduits. Also, while as stated above, in most instances the weight of the platelet will be larger than the buoyancy force of the working fluid and thus the working fluid will be flowed upward through the cylinder, if the opposite is true and the weight of the platelet is less than the buoyancy force of the working fluid the system can be run by simply reversing the direction of flow of the working fluid from that described above, all flowing still being maintained in a vertical direction. The orientation of the above-described divergent fluid conduit systems would also be reversed accordingly. And, while the system according to the present invention requires a vertical disposition, small excursions from the vertical, e.g., ± about 5°, can be tolerated and a workable system will still result.

The present invention has been described in terms of producing hydrogen for use in a fuel cell, however, the bromine produced also has fuel cell utility. Note in this regard, an article by Glass et al, "Performance of Hydrogen-Bromine Fuel Cells", *Advances In Chemistry Series,* vol. 47, 1964, A.C.S. Applied Publications, which describes the various advantages of such a system.

The bromide system useful with the present invention can also be run at reduced pressures and concentrations such that the photoelectrolytic cell can be used with voltages equivalent to the use of such things as hydrogen but with the advantages of dealing with the liquid bromine produced, thus eliminating the problems associated with a product which exists as a solid such as iodine under normal solution conditions. Also, the large optical absorption coefficients of even dilute solutions of other halogen dissociation products such as iodine would have a severely adverse effect on the efficiency of a system which utilizes radiant energy such as light as a power source as in the disclosed invention.

Another advantage of the bromide electrolyte system is the reduced overvoltages and reduced corrosion effects associated with the use of such systems as compared with conventional electrolytes, also broadening the range of semiconductor systems which can be used. Chloride or fluoride electrolyte systems, for example, which are more corrosive than even conventional water dissociation systems and solid iodine dissociation products would all clearly be inferior in the system of the present invention. There are also very definite advantages of the bromide system specifically in the elimination of the overvoltages associated with chloride and especially water dissociation products. Note the Glass et al article mentioned supra at page 204 and U.S. Pat. No. 4,021,323 at column 7. This is not to exclude other conventional electrolyte systems from the scope of the present invention, but the bromide electrolyte systems are definitely preferred.

While solar energy is the preferred source of radiation in the process and apparatus of the present invention, other radiant energy sources can be used such as laser radiation or light emitting solid state diodes, the only requirement being that the radiant energy be of proper wavelength and sufficient intensity to evolve hydrogen gas in the particular system being irradiated. The proper wavelength required relates to the particular semiconductor being used. The wavelength must be short enough to at least match the characteristic of the particular semiconductor used. The semiconductor will not absorb radiant wavelengths longer than its band gap radiation characteristic. In fact, one of the advantages of the use of a bromide electrolyte is the elimination of the corrosion and oxidation problems of other conventional electrolytes which attack many semiconductor materials, thus enabling a broader range of semiconductor material to be used. With a broader range of semiconducting material thus available, a broader range of light wavelength can be used to more efficiently power the system. For example, conventional hydrogen gas generating electrolysis systems such as those run by water dissociation would not permit the use of silicon semiconductors because of the corrosive effects of the free oxygen also produced on such semiconductor. Because of the overpotential required to run such a cell, the corrosive effects of the oxygen in such an environment would be prohibitive. However, in the herein described system because of the lack of an overvoltage problem with the use of bromides such as HBr and the noncorrosive effects of the bromine produced on a silicon semiconductor in such an environment a silicon semiconductor can be used. Therefore, because silicon semiconductors work effectively to convert radiant energy to electrical energy at wavelengths up to 11,000 Å, a greater, more efficient light gathering source can be used in the disclosed system.

Multilayered semiconductor material comprised of a gradient of diminishing width band gap material is also available to the invention process in view of the advantages encompassed in the use of the bromide electrolyte. Note, for example, U.S. Pat. No. 4,011,149 at column 2, lines 18–20 in this regard.

The Nernst equation which governs the cell potential relationship required for electrolysis in this process can be described as follows:

$$E = E° + 0.059 \log P_{H2} + 0.059 \log C_{Br2} - 0.059 \log C_{HBr}$$

wherein
  $E°$ = standard cell potential for cell components (e.g. for HBr electrolysis 1.06 volt),
  $P_{H2}$ = partial pressure of hydrogen produced in the cell,
  $C_{Br2}$ = molar concentration of bromine liquid produced in the cell,
  $C_{HBr}$ = molar concentration of hydrogen bromide or other bromide in the cell,
  E = the threshold voltage or cell potential to be overcome by the photovoltage. This is the voltage at which current begins to flow in the cell and significant amounts of hydrogen and bromine begin to evolve.

The preferred parameters for efficient operation of the systems of the present invention are:

$P_{H2} > 0.05$ psi $C_{Br2} > 0.1\%$ $C_{HBr} < 48\%$

A cell with such parameters can be efficiently run at temperatures between about 0° and 100° C. Percents as recited throughout the disclosure are percents by weight.

As stated above, the key component in the electrolytic solution is the electrolyte (and preferably bromine) compound present in the solution in amounts up to about 50% by weight, with a concentration of about 48% by weight preferred. This provides the hydrogen (and bromine if desired) to run the ultimate fuel cell which the photoelectrolytic cell is intended to produce. While water is the preferred solvent for the electrolyte, and hydrogen bromide the preferred electrolyte, the system is readily adaptable to other solvents and bromide containing electrolytes. For example, alcohols or amines may be used as solvents for the system and such bromide electrolytes as KBr, NaBr, LiBr, CsBr and $SrBr_2$ may be used either individually, as mixtures or admixtures with the HBr. If alcohol or amine solvents are employed it is preferred to add at least small amounts of water to the system, especially if a bromide other than HBr is used as the bromide electrolyte. The concentration of the hydrogen bromide may be any concentration up to the saturation point of the solution (e.g., about 50% by weight and preferably about 48% by weight), provided the cell potential does not reach the corrosion potential for the semiconductor being used. The system may also be run at any operable pressure with up to 1 atmosphere being preferred.

As mentioned above, the source of energy to run the cell can be any radiant energy source with wavelengths shorter than the band gap radiation characteristic of the semiconductor used. For example, for a silicon semiconductor, any light source with wavelengths less than 11,000 Å could run the system. Also, as mentioned above, one of the advantages of the hydrogen bromide system is the broadened range of semiconductor material available by using the bromide electrolyte, and the cell potentials and lack of corrosion resulting from such use.

Also, the radiant energy impinging the system of the present invention can also be used in conjunction with conventional solar cells, e.g., to provide the energy to pump the electrolyte solution.

Although this invention has been shown and described with respect to a preferred embodiment, it will be understood by those skilled in this art that various changes in form and detail thereof may be made without departing from the spirit and scope of the claimed invention.

We claim:

1. A process for producing hydrogen gas from an electrolyte solution, comprising suspending in substantially static position a plurality of semiconducting platelets in a vertically flowing electrolyte solution of relatively constant flow contained in a radiant energy transparent divergent fluid conduit, the location of the platelets in the conduit being controlled by the flow rate of the electrolyte, the platelets comprising an ohmic contact sandwiched between an n-doped semiconducting layer and a p-doped semiconducting layer, with a layer of electrical insulation covering the exposed edge of the ohmic contact, impinging said platelets with radiant energy sufficient to cause the evolution of hydrogen gas at the surface of the p-doped semiconducting layer and collecting the hydrogen so produced.

2. The process of claim 1 wherein the divergent conduit is immediately preceded by a convergent conduit.

3. The process of claim 2 wherein the convergent conduit is immediately preceded by a conduit of constant cross-sectional area.

4. The process of claim 1 wherein the electrolyte is a bromide containing electrolyte present in an amount of up to about 50% by weight and the solvent is water.

5. The process of claim 1 wherein the radiant energy is solar energy.

6. The process of claim 1 wherein the platelets each have a photoactive surface area greater than 1 $mm^2$ on each photoactive side.

* * * * *